UNITED STATES PATENT OFFICE.

SAMUEL LEVY, OF DENVER, COLORADO.

PREPARATION OF YEAST.

SPECIFICATION forming part of Letters Patent No. 255,176, dated March 21, 1882.

Application filed June 9, 1881. (Specimens.)

*To all whom it may concern:*

Be it known that I, SAMUEL LEVY, a citizen of the United States, residing at Denver, in the county of Arapahoe and State of Colorado, have invented a certain new and useful Improvement in the Preparation of Compressed Yeast; and I do declare that the following is a full, clear, and exact description of the invention, which will enable others skilled in the art to which it appertains to make the same.

Heretofore great difficulty has been encountered in the preparation of compressed yeast that could be easily dried, put in proper condition for the market, and at the same time to be of a nature that it could be preserved for a long period of time.

To overcome the first two difficulties named the practice has been to mix the yeast with some drying substance, as flour or starch; and while this practice partially obviated these difficulties, the yeast was rendered thereby inferior in quality and could not be preserved for any length of time.

The object of my invention is to overcome all these difficulties in the preparation of a compressed yeast that shall be of a superior quality, that can be easily dried without the admixture of any drying substance, that can be placed upon the market in any condition desired, either fresh, in powder, or in cakes, and that can be preserved for a long period of time, and at the same time to extract the greatest amount of yeast possible from the substances used in its preparation.

In carrying out this new process I place about ten pounds of starch, more or less, to the bushel of grain used in a mash of rye, corn, and malt in a fermenting-tub, and add a sufficient quantity of artificial yeast to bring the mass into an active state of fermentation. When the fermentation has proceeded far enough the yeast rises to the surface and is skimmed off. This is continued until the mash grows weak. Having previously made a preparation by putting into water, of a temperature of 150° Fahrenheit, of rye and malt, say five to ten per cent. of the amount of mixture in the fermenting-tub, and letting it stand twenty-four hours, I add of this a sufficient quantity to the mass in the fermenting-tub to bring the same into an active state of fermentation. Precaution should be taken to have the temperature of this preparation, when placed in the fermenting-tub, about the same as that of the mass in the tub. The addition of this preparation, as said, brings the mass again into an active state of fermentation, and the yeast rising to the surface is skimmed off. By repeated additions of this preparation as the mash grows weak the process is continued until all the yeast is extracted from the mass in the fermenting-tub. The yeast is then placed in water and allowed to settle. It is then taken out, pressed, and dried, and it is found that it dries very readily. The quality is superior, and it can be used either fresh, in powder, or in cakes, and can be preserved for a great length of time, retaining its strength and freshness. The yield is from fifty to seventy per cent. of the amount of starch used, varying according to the strength of the starch.

I know that starch has been used in the preparation of compressed yeast; but in other processes it has been mixed with the yeast, and the result has been an article of inferior quality, that could not be preserved.

The amount of starch used increases the quantity and improves the quality of the yeast. By no other process can yeast be prepared as a baking-powder, and by no other process can its quality be made such that it will readily dry and retain both strength and freshness for a long period of time. Gschwind uses rice-flour to mix with wet yeast to cause the same to dry without souring. Pfeiffer simply presses the water from his mixture after it has passed into a fermenting stage, and makes of it yeast-cakes. The yeast of Goll & Spinner consists simply of a paste of various ingredients combined with fermented rice-flour and hop-water. I skim the yeast off as it rises to the top, settle it in water, and find that it dries readily, and can be used either in powder or made into cakes.

Having fully described my invention, what I desire to claim and secure by Letters Patent is—

The process of preparing compressed yeast, consisting in mixing starch with a mash of rye, corn, and malt in a fermenting-tub, adding from time to time to the mixture as the fermentation grows weak a warm mixture of rye and malt, skimming the yeast from the surface as it rises, settling it in water, and then drying it, making the process continuous, substantially as set forth.

SAMUEL LEVY.

Witnesses:
F. J. MOTT,
ADOLPH REICHARD.